July 20, 1937.  G. M. DEMING  2,087,279
FLOAT GAUGE
Filed Aug. 1, 1935
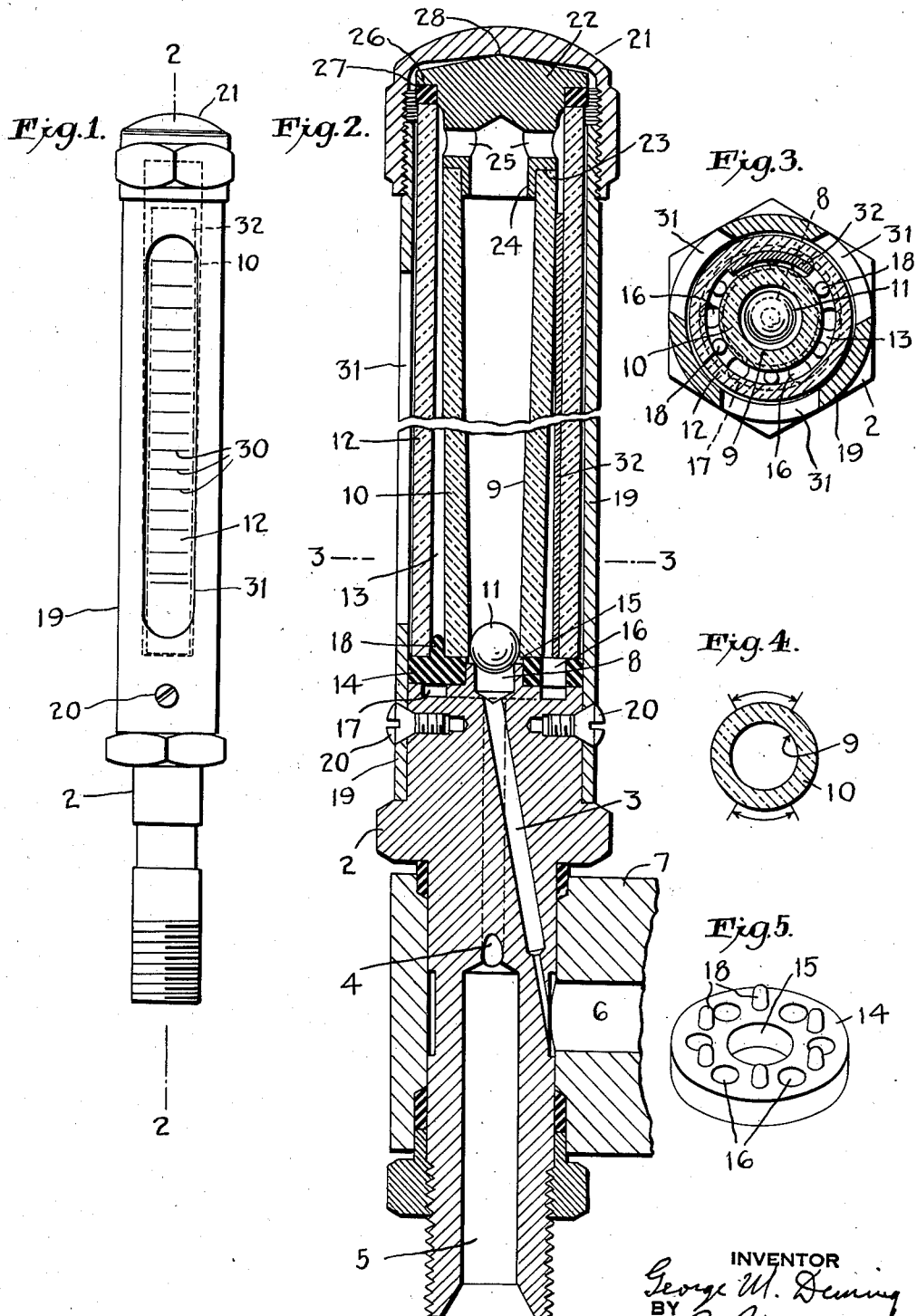

Patented July 20, 1937

2,087,279

UNITED STATES PATENT OFFICE 2,087,279

FLOAT-GAUGE

George M. Deming, East Orange, N. J., assignor to Air Reduction Company, Incorporated, New York, N. Y., a corporation of New York Application August 1, 1935, Serial No. 34,166

2 Claims. (Cl. 73—209)

This invention relates to flow-meters of the float-gauge type, and more especially to that kind of float-gauge having concentric transparent tubes.

Objects of the invention are to facilitate manufacture and assembly, to keep the transparent tubes in substantially concentric relation notwithstanding necessary manufacturing tolerances, to insure gas tightness, and to provide a well protected tube structure of excellent visibility.

In the accompanying drawing forming part hereof:

Fig. 1 is a front elevation of the preferred embodiment of the float-gauge of the improvement, removed from its holder;

Fig. 2 is a vertical section taken on the line 2—2 of Fig. 1 and including the holder;

Fig. 3 is a horizontal section taken on the line 3—3 of Fig. 2;

Fig. 4 is a cross-section through the float tube, with indications showing the extent of front and back markings; and Fig. 5 is a perspective view of a gasket which is interposed between the concentric transparent tubes and the base.

The base 2 of the float-gauge has an uptake passage 3 and one or more downtake passages 4. One of the latter passages is shown principally in dotted lines in Fig. 2, where it is seen opening into the outlet 5 of the gauge. Gas flowing to the gauge passes through a passage 6 in a holder 7, and enters the uptake passage 3. The upper end of this passage opens into a central cup 8 formed on the top of the base 2. This cup is at the base of the tapered bore 9 of a glass float tube 10, and the float ball 11 rests on the edge of the cup when no gas is passing.

Concentric with the float tube is an outer glass tube 12, the space 13 between the tubes conducting the gas downward from the top of the float bore 9 to the downtake passage 4 in the base.

A soft rubber gasket 14 is interposed between the lower ends of both transparent tubes and the top of the base 2, to make two tight joints at this region. The central opening 15 in the gasket permits the entering gas to reach the float bore 9, and other openings 16 arranged in a circular fashion allow for egress from the inter-tube space 13 to an annular channel 17 in the top of the base 2, with which annular channel the exit passage or passages 4 are in communication. The gasket 14 is seated on annular surfaces of the top of the base inside and outside the annular channel 17, and the central opening 15 of the gasket fits outside the metal lip of the cup 8, so that the ball 11 will rest on this lip and not on the gasket. An important feature of the gasket 14 is that of soft, tapered protuberances 18 interspersed with the apertures 16, so that these protuberances enter between the tubes 10 and 12. These protuberances serve to keep the glass tubes in proper concentric relation and allow for dimensional variations.

A rigid casing 19 is secured to the outside of the base 2 by screws 20, and the upper end of this casing has external screw threads which are engaged by internal threads of a cap 21, which when screwed down presses both transparent tubes downward against the gasket 14 resting on the base.

An internal top piece 22 has a shoulder 23 bearing on the top of the float tube 10 and a hollow centering lip 24 entering the bore of this tube. Transverse openings 25 in this top piece make it possible for the gas to pass from the top of the float bore 9 to the space 13 between the tubes. Another shoulder 26 on the piece 22 bears against a sealing gasket 27 which is placed between this shoulder and the top of the outer tube 12.

When the cap 21 is screwed on the casing 19 it thrusts the internal piece 22 without turning the latter, and the better to insure straight thrust against the tubes and the gasket 27, the top of the piece 22 is shaped to have only a small central point or area of contact 28 with the under side of the cap 21.

The float-tube 10 is provided with graduations 30, but these graduations are neither circular or on one side only, but are short lines engraved on both the front and rear portions of the tube, as indicated by the angles and arrows of Fig. 4. It has been found that if ring markings are used a confusion of images is superimposed along each side of the float-tube because of the numerous surfaces of the glass available for reflection. The method of graduation here employed reduces this trouble to a negligible consideration, and the lines placed on both the front and the back of the float-tube obviate parallax errors in reading the flow-meter.

Three equidistant vertical windows 31 are provided in the casing, not only so that the ball of the float-gauge may be seen from many different directions, but also to permit light to illuminate the float-tube and float-ball no matter what its direction of incidence. This construction is also most advantageous for adequate strength of casing commensurate with proper illumination. When an instrument of this kind is used in oxygen therapy it is highly important both that the transparent tubes be protected from injury and that the float indicator be readily visible.

A scale 32 is inserted in the down-flow space 13 between the tubes, this scale being a strip of metal, paper or other suitable material bearing figures and letters to correspond with the graduations of the float-tube. The provision of this separate scale avoids the loss of visibility which would be entailed by engraving letters and figures on the float-tube, besides being more economical. The scale is located in direct line back of one of the windows 31 and in front of a wall of the protective casing.

I claim:

1. Improvement in a float-gauge which has a base provided with passages, concentric transparent tubes, the inner one of which has a tapered float bore from the top of which the gas passes downward in the space between the transparent tubes to one of the passages in the base, and means for pressing both transparent tubes toward the base, said improvement comprising a soft gasket interposed between both tubes and the base, this gasket having, in addition to gas escape openings in the region between the tubes, a number of tapered protuberances to keep the tubes in substantially concentric relation.

2. A float-gauge having concentric transparent tubes, the inner one of which has a tapered float bore, a casing having three eqidistant vertical windows, and a separate scale element disposed in the space between the transparent tubes, in direct line back of one of the windows and in front of a wall of the protecting casing.

GEORGE M. DEMING.